United States Patent
Timmermann et al.

(10) Patent No.: US 6,504,874 B1
(45) Date of Patent: Jan. 7, 2003

(54) ARRANGEMENT FOR DIGITAL TRANSMISSION OF INFORMATION ACROSS WIRES

(75) Inventors: Andreas Timmermann, Ronnenberg (DE); Jürgen Schröder, Springe (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/207,879

(22) Filed: Dec. 8, 1998

(30) Foreign Application Priority Data

Dec. 18, 1997 (DE) ......................... 197 56 438

(51) Int. Cl.⁷ ................................ H04B 3/00
(52) U.S. Cl. .................. 375/257; 375/258; 370/524; 379/27.01; 379/252
(58) Field of Search ................ 375/257, 258; 370/524, 395.6, 506; 379/27.01, 252

(56) References Cited

U.S. PATENT DOCUMENTS

| 5,136,411 A | | 8/1992 | Paik et al. ................ 359/125 |
| 5,189,673 A | | 2/1993 | Burton et al. ............. 370/110.1 |
| 5,202,780 A | | 4/1993 | Fussgänger .............. 359/125 |
| 5,523,869 A | | 6/1996 | Still et al. .................. 359/120 |
| 5,682,423 A | * | 10/1997 | Walker ...................... 379/252 |
| 5,694,398 A | * | 12/1997 | Doll et al. ................. 370/524 |
| 6,320,940 B1 | * | 11/2001 | Oi .............................. 379/27.01 |

FOREIGN PATENT DOCUMENTS

| AU | 2064492 | 2/1993 | ........ 359/137 |
| DE | 43 43 456 A1 | 8/1994 | |
| DE | 4437215 | 4/1996 | |
| EP | 0421602 | 4/1991 | |
| EP | 0668688 | 8/1995 | |
| WO | 9109478 | 6/1991 | ........ 359/125 |

OTHER PUBLICATIONS

"Glasfaser bis ins Haus—Gedanken zur Stromversorgung" by Ewald Braun, *ntz, Breitbandkommunikation*, vol. 44 (1991), No. 1, pgs.

(List continued on next page.)

Primary Examiner—Shuwang Liu

(57) ABSTRACT

An arrangement is provided for digital transmission of information via lines between a line termination (1) of a telecommunication network and subscribers (Tln) connected to the line termination. At least one terminal of a subscriber (Tln) is connected to a network termination (2) via an electric line (L3). The network termination (2) is connected to the line termination (1) via a line (L2) having metallic conductors. The line termination (1) has a voltage source (SV) for supplying power to itself and to the network termination (2) and the subscriber (Tln) terminals. For increased reliability during operation, two separate power supply units (SVE1, SVE2) are arranged in the network termination (2). One of the two separate power supply units (SVE1, SVE2) powers active components of the network termination (2) and the other of the two separate power supply units (SVE1, SVE2) powers the subscriber (Tln) terminals. The two separate power supply units (SVE1, SVE2) are connected to the voltage source (SV) of the line termination (1) via separate lines (A1, A2).

2 Claims, 3 Drawing Sheets

OTHER PUBLICATIONS

IEEE Communications Magazine, Spencer et al., Establishing Reliability and Availability Criteria Fiber–in–the–Loop Systems, Mar. 1991, pp. 84–90.

Globecom '89, Rowbotham et al., Plans For the Bishops Stortford (UK) Fibre to the Home Trials, Nov. 1989, pp. 1320–1325.

ANT Nachrichtentechnische Berichte, Feigal et al., FAST—ein Lichtwellenleiter–Pilotsystem für den Teilnehmeransclußbereich, Apr. 1992, pp. 94–102.

Proceedings of the National Communications Forum, Burrage, Some Architectural Evolution Options for Fiber in the Loop, Sep. 1991, pp. 408–414.

Hightower, "Economic FO system for new residential services", *Telephony,* Mar. 17, 1986, pp. 44–56 Opal Project in Stuttgart with Optical Amplifiers NTZ Bd 45 (1992) Heft pp. 11 & 12, Spektrum.

* cited by examiner

ARRANGEMENT FOR DIGITAL TRANSMISSION OF INFORMATION ACROSS WIRES

BACKGROUND OF THE INVENTION

1. Technical Field

The invention relates to an arrangement for digital transmission of information via lines between a line termination of a telecommunication network and subscribers connected to the line termination, wherein at least one subscriber terminal is connected to a network termination via an electric line, wherein the network termination is connected to the line termination via a line having metallic conductors and wherein the line termination has a voltage source for supplying power to itself and to the network termination and the subscriber terminals (DE 43 43 456 A1).

2. Description of the Prior Art

Digital transmission techniques can provide services of different types that are useful to subscribers of a telephone network. The services include, e.g., telephone, fax, IDN and ISDN (basic and primary multiplexed connections). The subscriber exchange area of the telephone network, i.e. the subscriber line network, is particularly important. Also of interest are other subscriber connections, for example point-to-point connections. All conventional "network structures" have a network termination with a power supply unit to which the subscriber terminals of at least one subscriber are connected.

A subscriber line network is described, for example, in the publication DE 43 43 456 A1 cited above. The line termination is formed as a cable distribution terminal containing active components and connected to an exchange of the telephone network via optical and/or electrical cables or lines. The network terminations include active components and will be referred to as termination distribution boxes. The termination distribution boxes are connected to the cable distribution terminal via cables and lines, respectively, which contain at least electrical conductors. In this way, the cable distribution terminal can supply power centrally from the voltage source to all active components of the cable distribution terminal and to the termination distribution box and also to the subscriber terminals. The termination distribution boxes and the associated switch units can be installed, for example, in the building of one or several subscribers. Only short electrical wires are routed from there to the subscribers' equipment. In this way, each subscriber has the option of being connected to channels with a transmission rate of, for example, 2 MBPS. This arrangement has proven to be effective in practice.

SUMMARY OF THE INVENTION

It is the object of the invention to further increase the reliability of the aforementioned arrangement for transmitting information.

The object is solved according to the invention in that two separate power supply units are arranged in the network termination, wherein one of the power supply units powers active components of the network termination and the other unit powers the subscriber terminals, and the two power supply units are connected to the voltage source of the line termination via separate lines.

With this arrangement, the two separate power supply units of the network termination and the subscriber terminals are each connected independent of each other to the central voltage or current source, respectively, of the line termination. A malfunction on the subscriber side, for example a malfunction due to a short circuit, does then not affect the network termination. The network termination and consequently the transmission system of the network termination remain operational. Modern telecommunication networks include a management system so that the malfunction can be localized and repaired within a short time.

This arrangement is particularly advantageous if two or more subscribers are connected to a network termination. The management system is then not only able to sense, but also to localize a malfunction at one of the subscriber sites. The malfunction can then be quickly repaired.

The invention will be fully understood when reference is made to the following detailed description taken in conjunction with the accompanying drawing.

The method of the convention will now be described with reference to an exemplary embodiment and the accompanying drawing.

DETAILED DESCRIPTION OF THE INVENTION

A "line termination" within the framework of the invention is, for example, an exchange of a telecommunication network. The data to be transmitted reach the line termination from higher level segments of the telecommunication network in one direction or from the connected subscribers in the other direction. The "network termination" is a device to which the terminals of the subscribers are connected. The network termination includes, for example, active components such as amplifiers, transmitter and receiver equipment, multiplexers and demultiplexers, to assign the data to be transmitted to each respective subscriber and to combine the data from the subscribers to a data stream, respectively.

Figure 1:
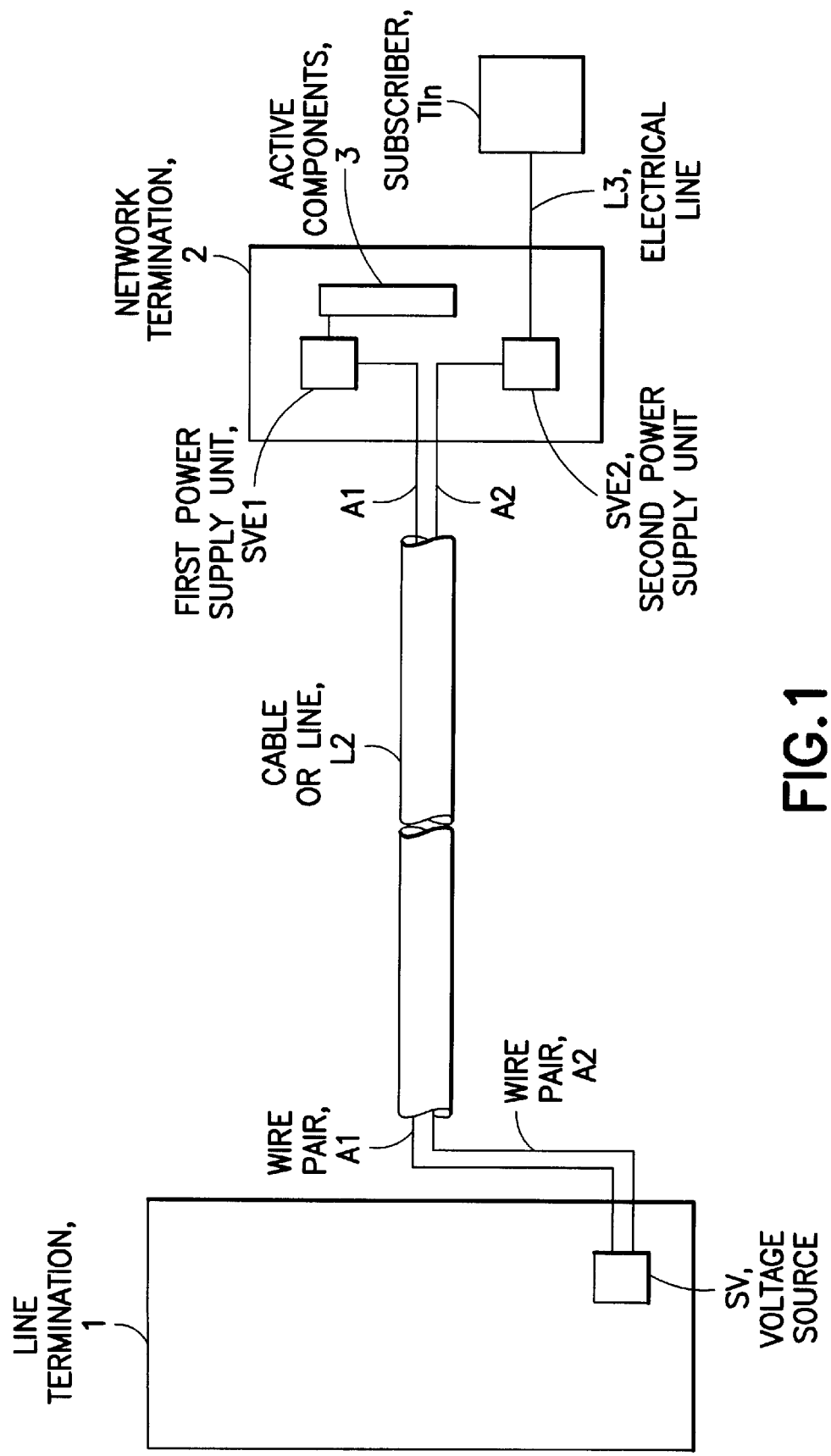
FIGS. 1 and 2, which are two schematic block diagrams of different arrangements according to the invention, and FIG. 3, which is a schematic block diagram of an application of the invention shown in FIG. 1 applied to an embodiment in FIG. 2.

FIG. 1 illustrates a detail of a telecommunication network generally indicated as 10 for a point-to-point transmission:

A voltage source SV is located in a line termination 1 of a telecommunication network. The line termination 1 can be an exchange of a telecommunication network. The voltage source SV can be either the 230 VAC mains—with or without a battery buffer—or a sufficiently large battery. A network termination 2 is connected to the line termination 1 via a cable or a line L2 that includes at least two electrical pairs of insulated conductors A1 and A2. The network termination 2 includes transmission systems with active components 3. The network termination 2 amplifies, for example, the optical or electrical input signal, recovers the data in the signal, if necessary converts the data to a different format and transmits the data to the connected subscriber Tln. If several subscribers Tln are connected, the network termination 2 assigns the data to the respective subscriber Tln. In the opposite transmission direction, the data of the subscriber(s) are transmitted from the network termination 2 to the line termination 1.

The network termination 2 can also include a management block with the other active components 3. The network termination 2 has a power supply unit SVE1 for its own power supply. The power supply unit SVE1 is connected to the voltage source SV of the line termination 1 via the pair of insulated conductors Al. The second power supply unit SVE2 of the network termination 2 is connected to the voltage source SV of the line termination 1 via the pair of insulated conductors A2. The terminal of the subscriber Tln is connected to the second power supply unit SVE2 and also to the network termination 2 via an electrical line L3. The network termination 2 and the subscriber Tln are supplied with electrical power independent of each other. The transmission system of the network termination 2 therefore remains operational even in the event of a malfunction in the region of subscriber Tln.

Figure 2:
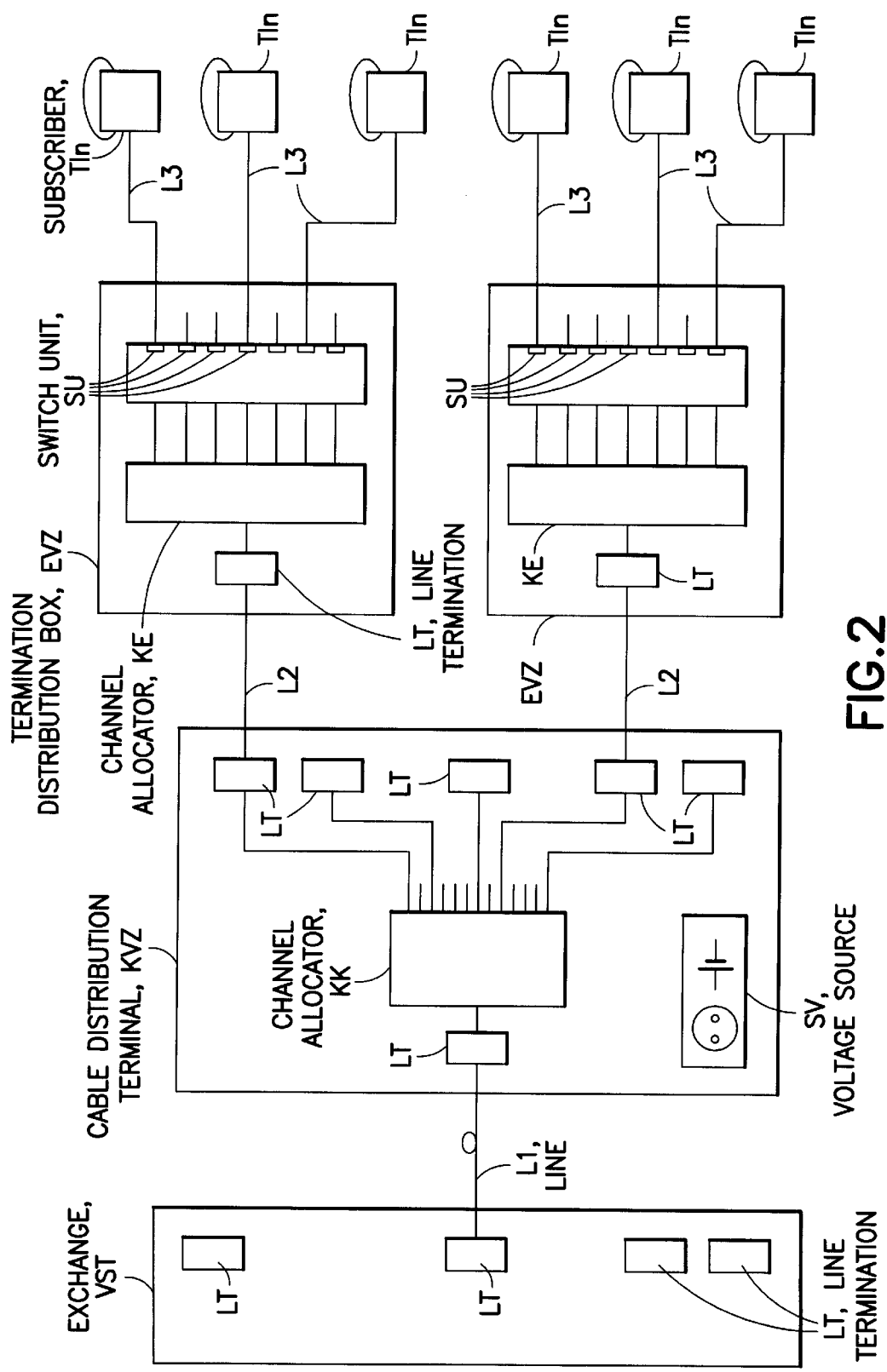
Figure 3:
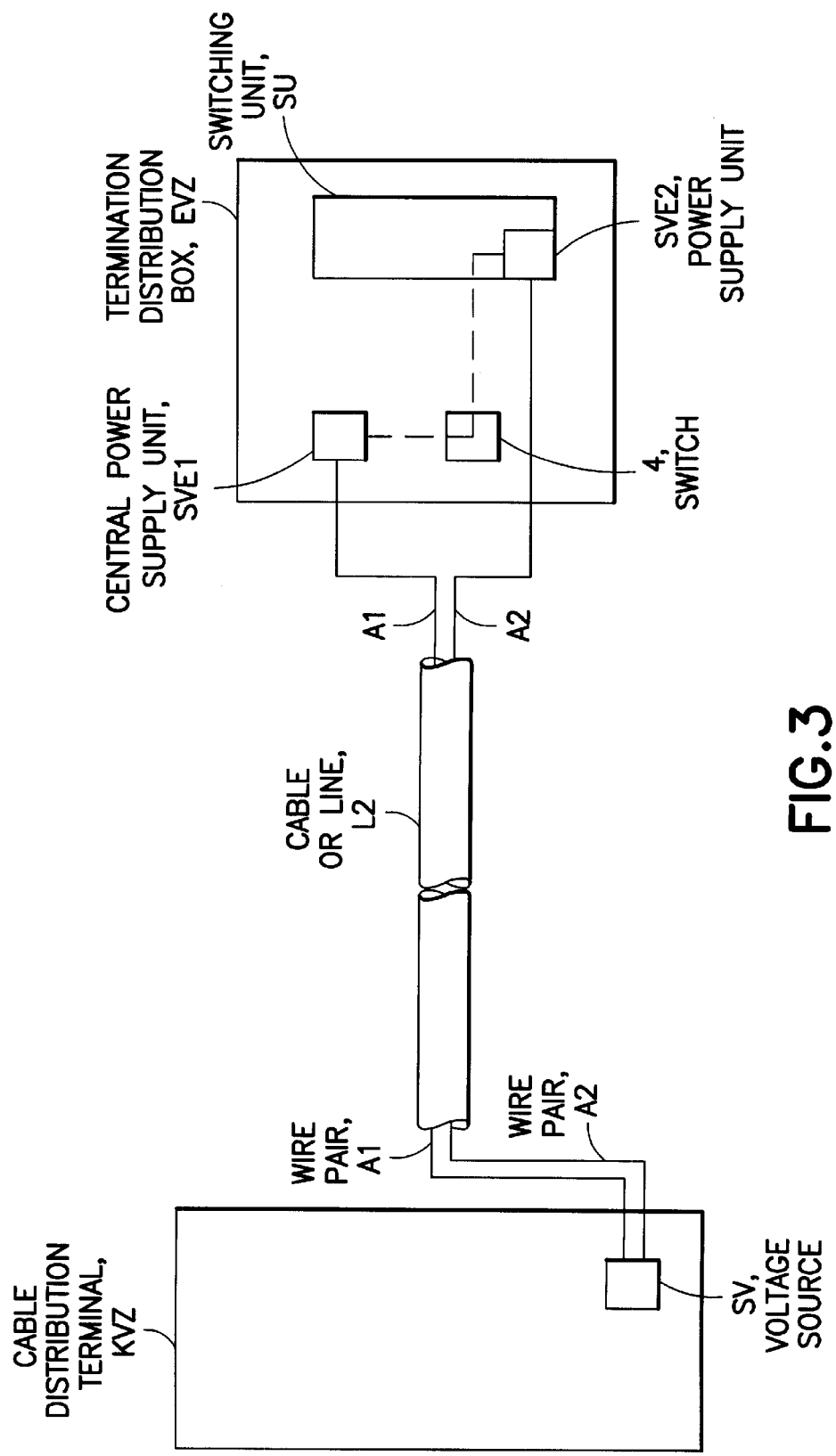

A section of a network with several subscriber terminals is illustrated in FIGS. 2 and 3. Components identical to those of FIG. 1 have the same reference numerals:

In FIG. 2, a cable distribution terminal KVZ is connected to an exchange VST of a telecommunication network—the exchange corresponds to the line termination 1 of FIG. 1—via a line L1 that includes optical and/or electrical transmission components. The cable distribution terminal KVZ which is an active terminal and is equipped with electrically active components, includes a channel allocator KK with at least two outputs for connection to network terminations that will be referred to as "termination distribution boxes EVZ". The outputs of the channel allocator KK are routed to line terminations LT. The cable distribution terminal KVZ is connected to the termination distribution boxes EVZ via the respective line L2 that includes at least electrical conductors. The line L2 can, in addition, include optical waveguides. The cable distribution terminal KVZ also includes the voltage source SV for supplying power to its electrical components.

Inside the termination distribution box EVZ, the lines L2 are connected to the line terminations LT. The termination distribution boxes EVZ are also active terminals and include electrically active components and a channel allocator KE with at least two outputs for connection to subscribers Tln. Also associated with the termination distribution boxes EVZ are switch units SU that are connected to the channel allocator KE. To each switch unit SU there is connected one subscriber Tln via an electric line L3. In the illustrated embodiments, three subscribers Tln are shown for each termination distribution box EVZ. At least one subscriber Tln is connected to one termination distribution box EVZ. However, more than three subscribers Tln can also be connected. The switch units SU are assigned to the termination distribution boxes EVZ and can be combined with them in the same room. The switch units SU can also be located directly at the subscriber Tln sites and connected to the channel allocator KE via electrical lines. A switch unit SU converts the data received from the termination distribution box EVZ to a service specific signal, e.g. an analog voice band signal or a digital signal in form of the So interface.

A termination distribution box EVZ mainly provides the network termination for the subscriber line L2 which can include, as mentioned above, both optical and electrical conductors for signal transmission. The termination distribution box EVZ amplifies the optical or electrical input signal, recovers the data in the signal and distributes the data to the connected switch units SU. In addition, the switch units SU can include a management block 3 (FIG. 1) for monitoring the termination distribution box EVZ and the switch units SU and for adjusting the channel allocator KE. In FIG. 3, the two power supply units SVE1 and SVE2 are also arranged in the termination distribution box EVZ.

The subscriber lines L2 includes at least the two electrical pairs of insulated conductors A1 and A2 that are connected to the voltage source SV of the cable distribution terminal KVZ. No further details of the connection of the pairs A1 and A2 or of the transmission elements of the subscriber lines L2 to the active components of the cable distribution terminal KVZ and the termination distribution box EVZ are provided in the drawings. FIG. 3 shows in an enlarged scale the parts of the subscriber lines L2 that are essential for the present arrangement. Accordingly, the two electrical pairs of insulated conductors A1 and A2 are connected to the voltage source SV in the cable distribution terminal KVZ. Each of the pairs of insulated conductors A1 and A2 is routed to a respective termination distribution box EVZ where the pair A1 is directly connected to the central power supply unit SVE1 of the termination distribution box EVZ, while the pair A2 is connected to the power supply unit SVE2 of the switch units SU to reliably supply power to these units.

Consequently, the termination distribution boxes EVZ and the switch units SU are connected to the voltage source SV of the cable distribution terminal KVZ via separate paths. The termination distribution box EVZ remains operational even in the event that, for example, all switch units SU of a termination distribution box EVZ malfunction due to a short circuit, i.e. the transmission system in this segment of the telecommunication network continues to function. This is also the case for other malfunctions, such as malfunction of a subassembly inside the switch unit SU (increased power consumption without causing a short circuit) or an overload when the planned operation conditions, e.g. the planned maximal simultaneity factor, are exceeded. The management system of the telecommunication network can therefore quickly determine and localize the malfunction in the switch units SU, and the malfunction can be quickly repaired.

The data can either be transmitted together with the power to the power supply units SVE1 and SVE2 via the pairs of insulated conductors A1 and A2, or the data can be transmitted separately, e.g. via glass fibers. When data are transmitted via the electrical wires, it is also possible to transmit the data only via one pair or to split the data for transmission via both pairs of insulated conductors A1 and A2.

To advantageously utilize any excess energy of the power supply units SVE1 or SVE2, a switch 4 can be incorporated between the power supply units SVE1 or SVE2. The switch 4 can be actuated depending on a voltage and can provide an electrical connection between the two power supply units SVE1 and SVE2. Excess energy from one power supply unit is then supplied to the respective other power supply unit. Such switch 4 can be, for example, a controllable current source.

The preferred embodiment described above admirably achieves the objects of the invention. However, it will be appreciated that departures can be made by those skilled in the art without departing from the spirit and scope of the invention which is limited only by the following claims.

We claim:

1. Apparatus for digital transmission of information via lines between a line termination of a telecommunication network and subscribers connected to the line termination, wherein terminals of at least one subscriber are connected to a network termination via an electrical line, wherein the network termination is connected to the line termination via a line comprising metallic conductors and wherein the line termination is provided with a voltage source (SV) for providing its own power and also power to the network termination and the terminals of the at least one subscriber, comprising:

two separate power supply units (SVE1, SVE2) arranged in the network termination (2), with one of the power supply units (SVE1, SVE2) supplying power to active components of the network termination (2) and the other power supply unit (SVE1, SVE2) supplying power to the terminals of the at least one subscriber (Tln), the two separate power supply units (SVE1, SVE2) being connected to the voltage source (SV) of the line termination (1) via separate lines (A1, A2).

2. Apparatus according to claim 1, wherein between the two separate power supply units (SVE1, SVE2) of the network termination (2) there is arranged a switch (4) that is actuatable as a function of a voltage and capable of transferring excess energy from a respective one of the power supply units (SVE1, SVE2) to a respective other of the power supply units (SVE1, SVE2).

* * * * *